United States Patent [19]

Abila et al.

[11] Patent Number: 4,991,858
[45] Date of Patent: Feb. 12, 1991

[54] CONNECTOR SEAL

[75] Inventors: Ernesto M. Abila; Vito J. Ciminello, both of Sugarland, Tex.

[73] Assignee: Hamilton Kent Manufacturing, Inc., Houston, Tex.

[21] Appl. No.: 320,151

[22] Filed: Mar. 7, 1989

[51] Int. Cl.$^5$ .............................. F16J 9/08; F16J 9/00; F16L 33/16

[52] U.S. Cl. ................ 277/205; 277/207 A; 277/212 C; 285/110; 285/111

[58] Field of Search ............. 277/12, 116.6, 117, 277/138, 140, 152, 153, 205, 206 R, 207 A, 37, 208, 212 C; 285/110, 111, 192, 236

[56] References Cited

U.S. PATENT DOCUMENTS

| | | | |
|---|---|---|---|
| 2,278,074 | 3/1942 | Hauf | 277/205 X |
| 2,295,770 | 9/1942 | Baker | 277/205 X |
| 2,342,458 | 2/1944 | Davies | 277/152 |
| 2,434,484 | 1/1948 | Chambers, Jr. | 277/152 X |
| 2,529,098 | 11/1950 | Noll | 277/205 X |
| 2,615,741 | 10/1952 | Nathan | 277/207 A X |
| 2,809,853 | 10/1957 | Nathan | 277/207 A X |
| 3,046,028 | 7/1962 | Nathan | 277/207 A X |
| 3,184,246 | 5/1965 | Kline | 277/206 R X |
| 3,787,061 | 1/1974 | Yoakum | 277/164 |
| 4,131,286 | 12/1978 | Bainard | 277/152 |
| 4,199,157 | 4/1980 | Skinner et al. | 277/207 A X |
| 4,215,868 | 8/1980 | Skinner et al. | 277/1 |
| 4,285,525 | 8/1981 | Held | 277/12 |
| 4,294,700 | 10/1981 | Casper | 277/138 X |
| 4,350,351 | 9/1982 | Martin | 277/153 X |
| 4,478,437 | 10/1984 | Skinner | 285/189 |
| 4,526,385 | 7/1985 | Wheeler | 277/153 |
| 4,804,290 | 2/1989 | Balsells | 277/153 X |
| 4,850,602 | 7/1989 | Goldstein et al. | 277/207 A |
| 4,856,795 | 8/1989 | DeLano et al. | 464/173 X |

FOREIGN PATENT DOCUMENTS

| | | | |
|---|---|---|---|
| 161486 | 1/1953 | Australia | 285/111 |
| 1457165 | 10/1966 | France | 285/110 |
| 214696 | 8/1967 | Sweden | 277/206 R |
| 859860 | 1/1961 | United Kingdom | 277/37 |
| 1283164 | 7/1972 | United Kingdom | 277/207 A |

Primary Examiner—Allan N. Shoap
Assistant Examiner—Scott W. Cummings
Attorney, Agent, or Firm—Lorusso & Loud

[57] ABSTRACT

A connector seal is provided for the interposition between an access well, or hole, in a wall of a fluid containment apparatus and the other surface of a conduit, or pipe, passing through that hole to transport fluid to the container without leaking. The connector seal has as a main element a spring ring made from a resilient material such as carbon steel, alloy steel, or plastic, for delivering a radial static load to the connector seal upon its being exposed to compressive forces.

13 Claims, 4 Drawing Sheets

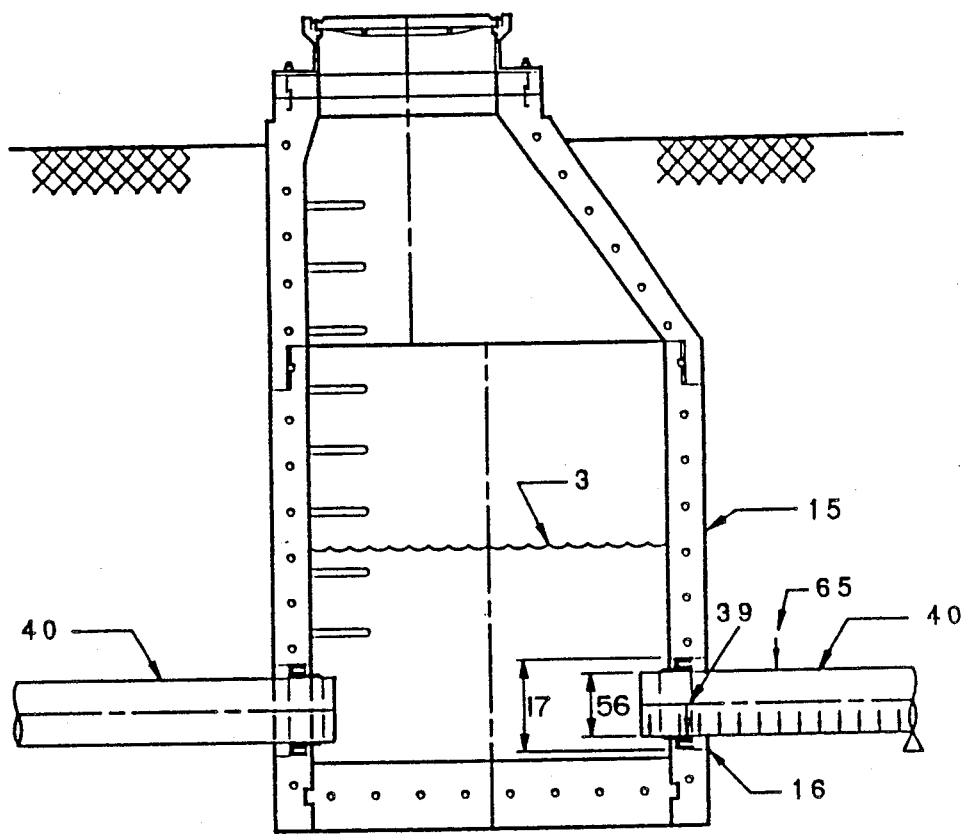
FIG. 4
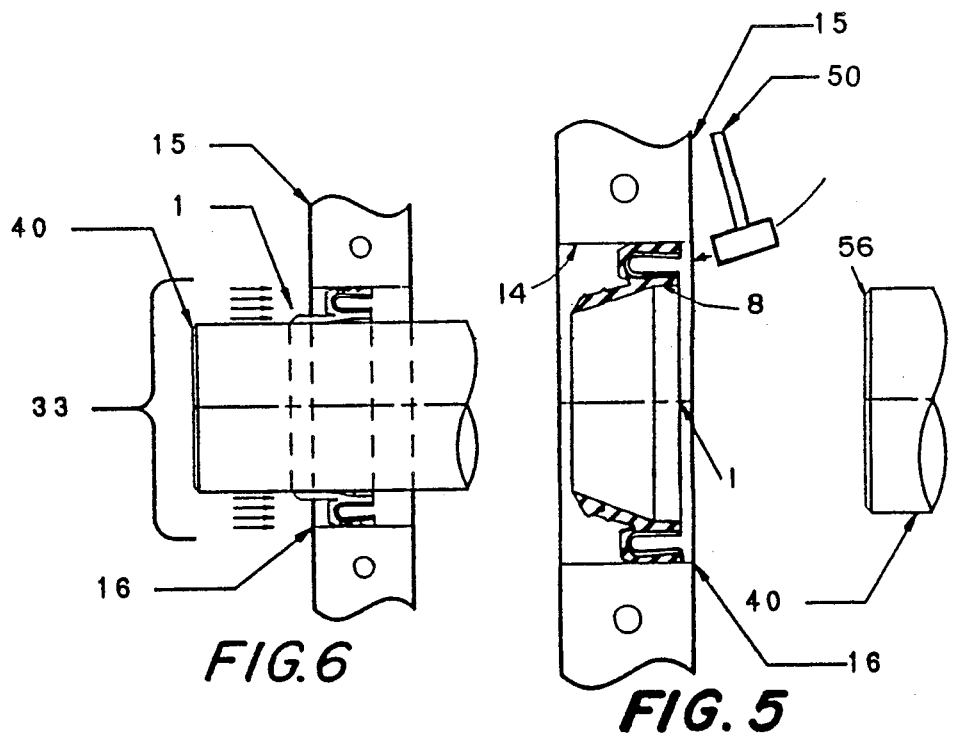
FIG. 6
FIG. 5

CONNECTOR SEAL

BACKGROUND OF THE INVENTION

The present invention relates to connector seals of the type which are used to connect sections of pipe to holes in concrete walls such as those used in manholes and dike walls. The connector seals are designed to attach to such a hole in a concrete wall and receive a pipe penetrating through that hole to position its open end in the manhole or other fluid well. The connector seals are used to ensure that any liquid contained within the pipe and emptying into the well is tightly sealed from escaping out of the well.

Several characteristics are important when considering connector seal design. First of all, the seal should assure a watertight connection between the pipe and the concrete access well. The connector seal should also be flexible so that it can compensate for pipe loads as well as for the misalignment or deflection of either the pipe or the concrete access well. Finally, it is important for the connector seal to have a low installation cost, offer a long service life, and allow easy routine maintenance.

There are basically two known connector seals which are designed to seal directly against a hole in a concrete wall. The first such seal is the cast-in-place type which is sealed directly into the hole at the same time that the concrete wall itself is being cast. The other type of seal, which is designed to seal against the hole in the concrete wall, is forced into position in an existing hole.

The cast in-place connector seal requires that the manufacturer of manholes position the connector seal into the cast mold wall with a connector seal holding device prior to casting of the wall. This step insures that the connector seal's major diameter profile is cast in place and becomes an integral part of the concrete wall. There are several disadvantages, however, with this type of connector seal. First of all, the cast-in-place installation process is very time-consuming, since mechanical or pneumatic installation tools must be used on every connector seal cast in place. Secondly, the connector seal is dependent upon the casting process' concrete load pressure to insure that concrete flows all around the connector seal's major diameter profile, thereby creating a seal when dry.

Another disadvantage with this type of design is that by the seal becoming an integral part of the concrete wall, if the connector seal is damaged or defective, it cannot be removed, because with this cast concept the seal is not designed to be removable. This type of cast-in-place connector seal design is shown, for example, in U.S. Pat. No. 3,787,061.

As previously mentioned, the other type of connector seal which has traditionally been used in this field is designed to be forced into place into an existing hole. This type of seal utilizes a expansion split-ring with a major diameter arc length sized so that when the split-ring is mechanically expanded and clamped at a lock joint, it will form into a circle the circumference of which will compress the major diameter outer profile of the connector seal's elastomeric body against a concrete wall's receptacle hole surface. The disadvantage with this type of design is that the expansion rings require hydraulic or mechanical devices, as well as a significant amount of time and labor, to expand and lock the expansion ring in place. One example of such a connector seal/expansion ring is shown, for example, in U.S. Pat. No. 4,478,437.

A problem with known connector seals made of elastomeric material is the phenomenon of stress relaxation. That is, as mechanical forces deform the connector seal, the elastomeric body is exposed to stress. Eventually, the elastomeric material begins to relax under that stress and assume the deformed shape. This deformation results in a less efficient seal.

It is therefore the principal object of the present invention to provide an improved connector seal which can be inexpensively manufactured and easily installed.

It is another object of the present invention to provide a means of compensating for the stress relaxation property of the elastomeric material use in the manufacture of connector seals.

A further object of the present invention is to eliminate the time consumed by the cast-in-place process as well as the need for special installation equipment associated with known connector seals.

Still another object of the present invention is to provide an innovative new means of compressing a connector seal's major diameter outer sealing contact surface profile against a concrete wall's receptacle hole surface.

SUMMARY OF THE INVENTION

The problems of known connector seals are greatly resolved by the device of the present invention which is a connector seal which is placed in position after the concrete wall is cast. The connector seal in accordance with the present invention does not require heavy equipment for its installation. The seal need only be hammered into place with the use of an ordinary rubber mallet. And, where large quantities are involved, an hydraulic press can be used to speed up installation.

The connector seal of the present invention includes an elastomeric body and a spring ring. As the connector seal is hammered into place, arrow-like wedges formed on the outer surface of the elastomeric body insure that it cannot be backed out of the hole into which it is being inserted. These arrow-like wedges also provide the present invention with its initial sealing ability.

An important feature of the connector seal in accordance with the present invention that enables it to surpass the performance of known connector seals is the spring ring which is bonded to the elastomeric body of the seal. Through utilization of the spring ring, the seal of the present invention is able to compensate for stress relaxation which is an inherent property of bodies which are made of elastomeric material. In this manner, the connector seal is able to offer a more watertight seal that will last over a long period of time than known connector seals.

A stiffening ring which is par of the spring ring of the connector seal is able to support and distribute the static concentrated load of the pipe. The stiffening ring also helps to guide the pipe during insertion. Once the pipe is inserted into the connector seal, an independently acting conical-type seal area is able to maintain a tight seal with the pipe regardless of any misalignment, deflection, or movement which may occur over the life of the connection.

Also, the manner in which the elastomeric body of the connector seal is formed, that is, with a tapered edge projecting inward toward the access well or manhole, further helps to insure that a watertight seal is achieved. This tapered edge additionally facilitates the installation process when placing the connector seal inside of the precast hole in the concrete wall.

BRIEF DESCRIPTION OF THE DRAWINGS

FIG. 4 is a cross-sectional view of a connector seal in accordance with the present invention being used to seal a section of pipe to the access well of a concrete wall of a manhole.

FIG. 5 is a cross-sectional view of a connector seal in accordance with the present invention depicting installation in a concrete wall of an access well by means of a rubber mallet.

FIG. 6 is a cross-section view of a connector seal in accordance with the present invention installed in a concrete wall of an access well and shown with a pipe inserted through it.

DESCRIPTION OF PREFERRED EMBODIMENTS

Figures 1, 2:
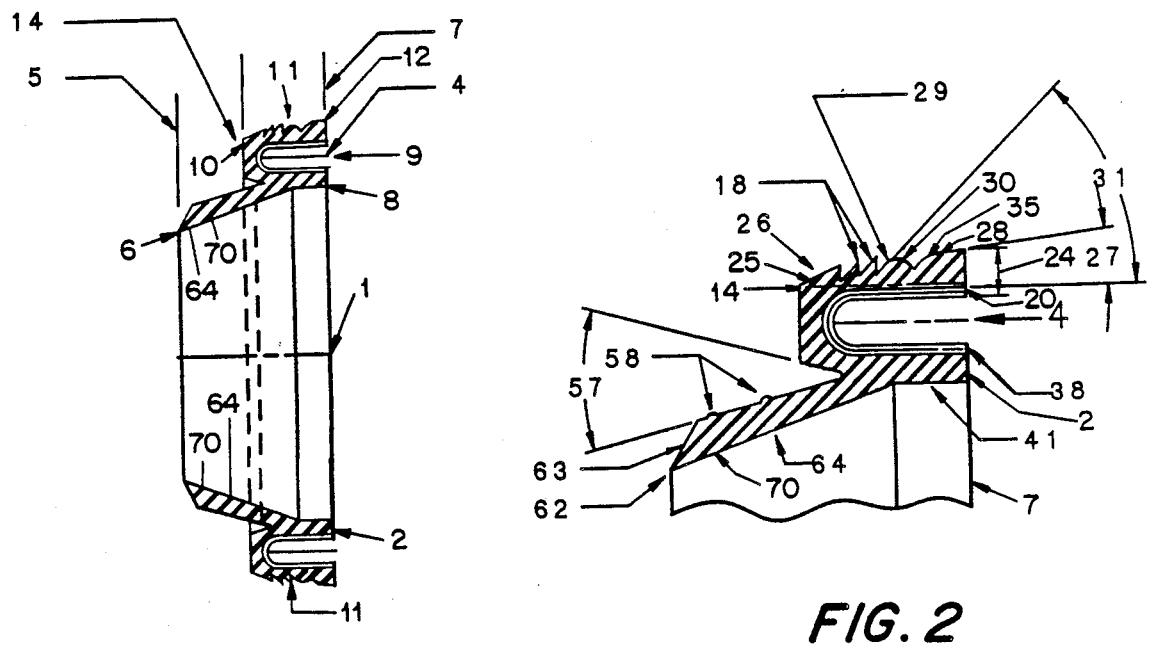
FIG. 1 is a cross-section view of a connector seal in accordance with a preferred embodiment of the present invention.
FIG. 2 is a fragmentary enlarged cross-section view of a part of the connector seal shown in FIG. 1.

At the outset, the invention is described in its broadest overall aspects with a more detailed description following. In its broadest aspects, in FIG. 1, there is illustrated a cross-sectional scaled-down view of a preferred embodiment of a connector seal in accordance with the present invention. The connector seal will generally be referred to by the numeral 1 and has an inner side 5 and an outer side 7. The major component of the connector seal 1 is the body 2 made of elastomeric material. Typical elastomers for the construction of the present invention could be polyethylene, polypropylene or any elastomeric material which will not be dissolved by the fluid 3 being contained. The second major component of the preferred embodiment of the present invention is a spring ring 4 made from spring materials such as carbon, alloy steel, or a resilient plastic material. These two major components are made up of elements, the functions and operations of which will be elaborated upon in the paragraphs to follow. FIG. 1 also illustrates the connector seal's 1 inner side 5 lip portion 70 which defines a minor diameter female opening 6, the outer portion 7, minor diameter 8, and the spring ring's 4 mean diameter 9. Also shown are the inner leading edge diameter 10, and the major diameter 12 of the trailing contact surface 11.

As is clearly shown in the drawings, the connector seal's 1 leading edge diameter 10, which is defined by the leading edge 14, is sized smaller than the diameter 17 of the access well 16 in the concrete wall 15. Also, a beveled surface 26 tapers back from the leading edge 14 and is designed to guide and facilitate the insertion of the connector seal 1 into the access well 16 of the concrete wall 15. As shown in FIG. 5, the installation of the connector seal 1 is effectuated by means of a rubber mallet 50. Also shown in FIG. 2 are arrow-like wedges 18 which provide a means by which reverse movement of the connector seal 1, while it is being driven by the rubber mallet 50 into an access well 16, is prevented. These arrow-like wedges 18 also act as an initial sealing means once installation has commenced.

For proper sealing and deformation of the connector seal of the present invention's outer contact surface 11, the body 2, and hence the sealing surfaces, of the connector seal 1 should be made of an elastomeric material with a durometer hardness of 40-50 shore A, or of other hardness values which allow the elastomeric materials to reform into the porous surface 19 of the receptacle surface, such as the access well 16 of the concrete wall 15. While the preferred material is polyisoprene as manufactured by the Burton Rubber Company, of Burton, Ohio, also included among the acceptable materials would be styrene-butadiene and ethylene-propylene-diene.

Figure 7:
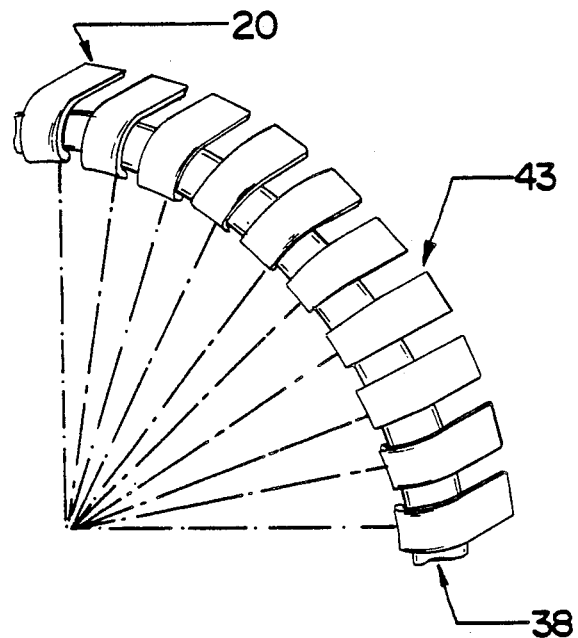
FIG. 7 is a three dimensional, one-quarter view depicting the spring ring constructed in accordance with the present invention's preferred embodiment.

To further enhance the sealing capacity of the connector seal 1, outer contact surface 11 is designed to resemble a half-arrow wedge. This design, together with the aid of the spring ring's moment arms 20, as shown in FIG. 7, allows for constant reformation of the elastomeric body's outer contact surface 11 as the Connector seal 1 is forced into the access well 16 of the concrete wall 15.

Figure 9:
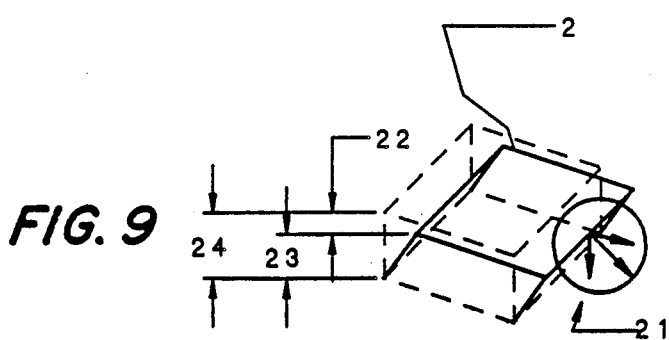
FIG. 9 is a three-dimensional view of an elastomeric body in a compression shear deformation mode shown with its resulting force diagram.

As shown in FIG. 9, this deformation compression shear mode 21 can be translated into a squeeze value 22. The squeeze value 22, is herein defined as the ratio of the connector seal's 1 deformed mode deflection 23, measured in inches, to the un-deformed thickness in inches 24. For example, this squeeze value 22 is typically 1% at the midpoint 25 of the leading beveled surface 26 (FIG. 2). Moreover, due to the connector seal's 1 outer contact surface 11 incline angle 27, coupled with its seal thickness 24, the percent of squeeze value at the secondary contact seal area 28 can be as much as 35% depending upon the application.

Further shown in FIG. 2 is another element of the connector seal's 1 outer contact surface 11. An inclined surface 29 is provided which intersects tangent to the arc radius curve 31 of a half O-ring 30. This arc radius 31 is designed to facilitate the easy installation of the half O-ring 30, which together with the inclined surface 29 provides the primary sealing surface of the present invention. The half O-ring 30 is also designed with a peak contact stress which is selected to meet the requirements of the application in which the connector seal 1 will be found.

Figure 3:
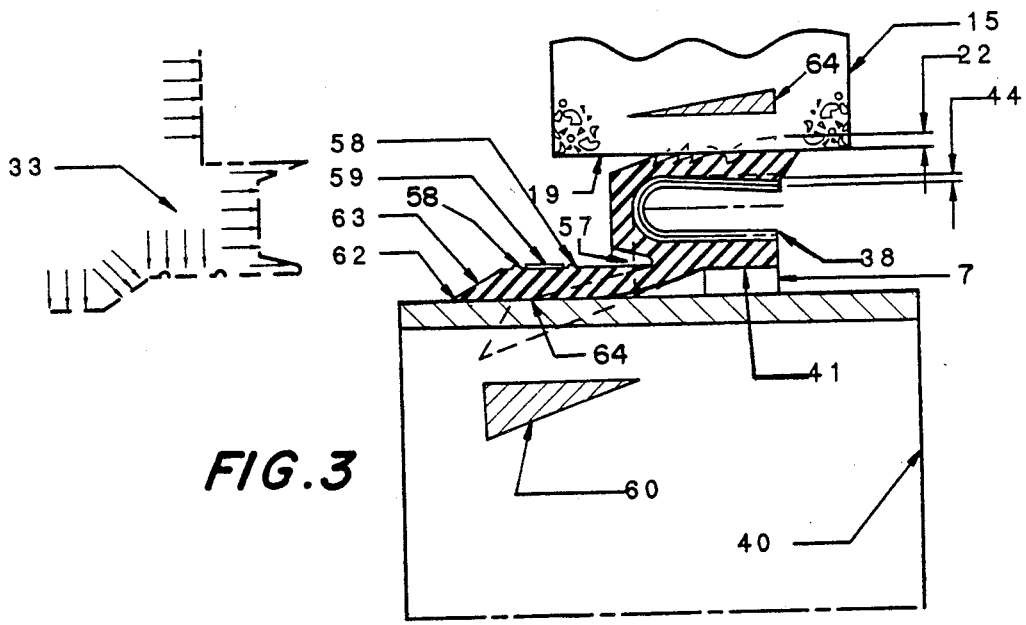
FIG. 3 is an enlarged cross-section view of the connector seal shown in FIG. 2 as it would appear while in compression while installed in an access well of a concrete wall and connected to a section pipe including an optional steel band which is used as a secondary clamping means.
Figure 11:
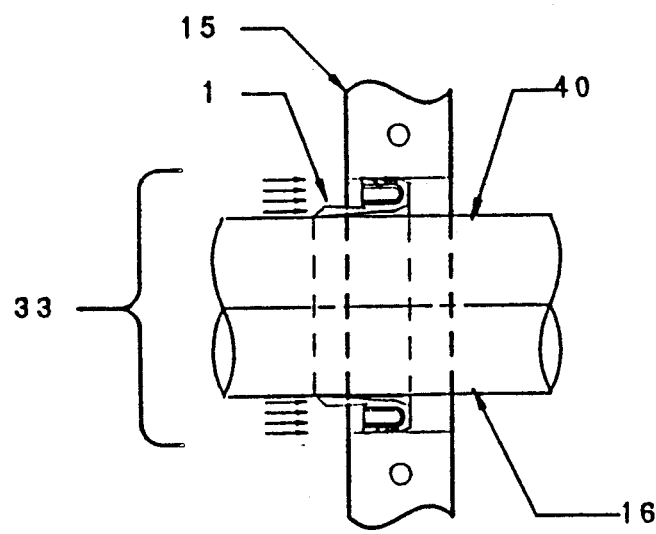
FIG. 11 is an enlarged cross-section view of the embodiment of the connector seal shown in FIG. 10.

This half O-ring 30 also contributes to the total seal friction force required to prevent the connector seal 1 from sliding out of the access well 16. Internal fluid forces, as depicted by arrows 33 in FIG. 3, 6, and 11 are generated by the weight of the fluid 3 on the inner side 5 of the connector seal 1 and are applied to the seal's internal surfaces. The internal fluid forces are depicted by arrows 33 in FIG. 3 acting on a profile identical to that formed by the connector seal 1 being positioned in between the pipe 40 and the porous surface 19 of the concrete wall 15. In the absence of the total seal friction force, these internal fluid forces 33 could force the connector seal 1 out of the access well 16.

The connector seal 1 has an additional arc radius leading surface 35 intersecting with an inclining surface 28 to act as a secondary sealing surface. Also when driven by a rubber mallet 50, such as is shown in FIG. 5, the moment arms 20 of the spring ring 4 provide a high-unit contact sealing force. The moment arms 20 also help to provide the remainder of the friction force required to securely anchor the connector seal 1 against the access well's 16 receptacle contact surface 19.

There is shown in FIG. 7 a reduced ¼-section wire frame three dimensional view of a spring ring 4 in accordance with the present invention. This spring ring 4 is bonded to the elastomeric body 2 within a U-shaped channel formed by the body 2. The spring ring 4 is a one-piece construction element formed from an alloy, carbon steel, or resilient plastic material. A stiffening ring 38 is provided as an integral part of the spring ring 4, and in addition to helping the spring ring 4 to maintain its desired configuration, the stiffening ring 38 is used to guide a pipe or conduit 40 into the connector seal's 1 inner side 5 minor diameter 6 female opening. Another function of the spring ring's 4 stiffening ring 38 is to provide a mean of supporting and distributing static concentrated load forces which are depicted by arrows 39 in FIG. 4. These static concentrated load forces 39 may be a total of a combination of miscellaneous concentrated loads 65 and/or the pipe's 40 uniform weight-per-foot load transmitted as a result of the pipe 40 resting on the stiffening ring's 38 inner minor diameter elastomeric covered surface 41. The spring ring's 4 stiffening ring 38 major function, however, is to provide a radial anchor point for all of the spring ring's 4 curved moment arms 20.

A void area 43 between the moments arms 20 of the spring ring 4 allows the moment arms to function as independent entities. It is an important characteristic of the connector seal 1 in accordance with the present invention, however, that all of the moment arms 20 work jointly with each other as well as with the elastomeric body's 2 outer contact surfaces 11 while simultaneously deflecting a equal distance 44. By so deflecting, the moment arms 20 exert a radial uniform compression static force which is represented by arrows 55. As depicted by the arrows' 55 increasing length, the uniform compression static force is greater at the outer side 7 of the spring ring 4 than at the inner, radial anchor point.

Additionally, it is another function of the moment arms 20 to compensate for stress relaxation, which is a property inherent in articles made from an elastomeric material. This stress relaxation property affects peak compression stress, since it is known that initial stress decays at a rate proportional to the logarithm of time. Accordingly, if the peak compression stress drops below the internal system pressure, a fluid leak can occur. In accordance with the present invention, however, as peak compression stress begins to decline due to stress relaxation of the elastomeric material, the compression static force generated by the moment arms 20 compensates for the drop in peak compression stress to prevent fluid leaks.

As shown in FIG. 5, the connector seal's 1 outer side 7 minor diameter 8 is sized larger than the outside diameter 56 of the pipe 40 to facilitate the pipe's entry. Also by so sizing this minor diameter 8, the connector seal 1 is able to compensate for misalignment while also providing a means of supporting concentrated loads 39 (FIG. 4) which may occur if the pipe 40 is not properly supported. Additionally, a void 57, similar to a cross-sectional view of a paraboloid segment, is provided to allow for unplanned permanent misaligned installations.

As shown in FIG. 2, the connector seal's 1 lip portion 70 inner sealing surface 64 defines the perimeter of a frustum or a cone, and is designed to work with the pipe 40. As the pipe 40 is installed, the elastomeric material of the lip portion 70 is stretched proportionally as the female minor diameter 6 of the lip portion's 70 increases to match the pipe's 40 outside diameter 56. The elongation of the lip portion 70 is translated into a compression radial force which causes the inner sealing surface to act as a seal which prevents fluids at zero pressure or fluids at underpressure from leaking.

The lip portion's 70 trailing edge 62 cross section is constructed similarly to that of a right-angle triangle. In this manner, the inclined surface 63 and inner sealing surface 64 are pressed between the outside diameter 56 of the pipe 40 and the fluid 33 under pressure. As a result, the unit loading forces 60 of the inner sealing surface 64 are increased and a more efficient seal is attained.

Figure 10:
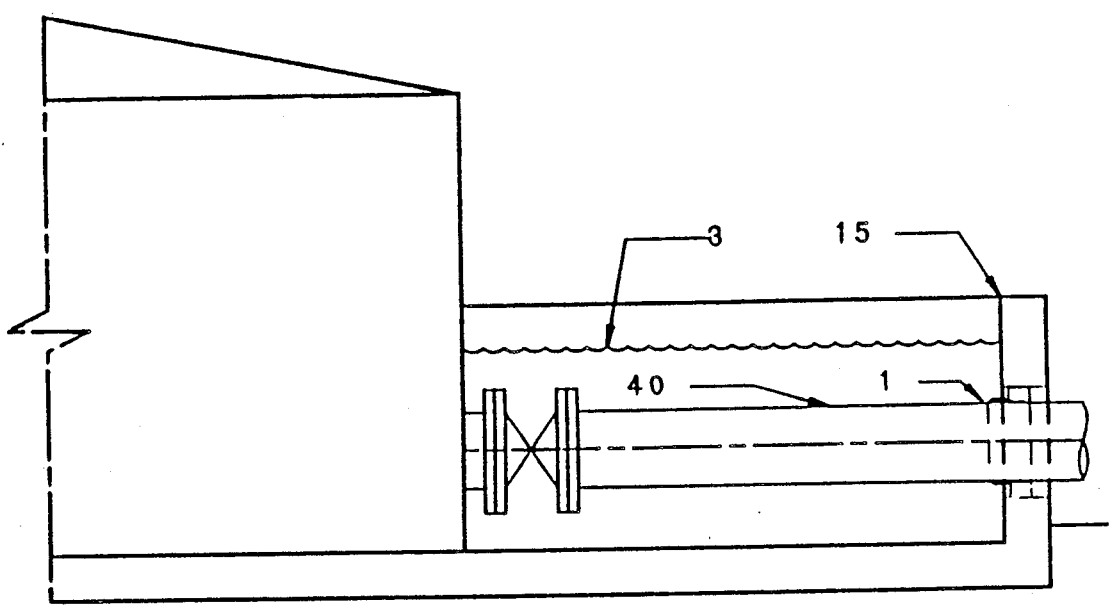
FIG. 10 is a cross-section view of the connector seal in accordance with an alternate embodiment of the present invention installed in a tank farm dike wall, wherein the outer portion of the connector seal projects such that the channel defined by it opens facing the inside of the tank.

In FIGS. 10 and 11 there is shown an alternate embodiment of the present invention in which by allowing the spring ring 4 to open toward the fluid 3 pressure generated by the internal fluid forces, as discussed above, is utilized. In this embodiment of the present invention, the U-shaped cross section defined by the elastomeric body 2 opens toward, rather than away from, the fluid 3. This allows fluid to come into contact with the spring ring 4 and urge the moment arms 20 against the access well 16 of the concrete wall 15. As a result, as the fluid pressure increases, the static compression forces operating on the connector seal 1 will increase as well. Thus, when functioning in this manner, the connector seal 1 of the present invention acts as a pressure-actuated seal.

Yet third possible embodiment of the present invention is depicted in FIG. 3 and involves a steel band 59 which can be used as a secondary clamp means. The steel band 59 is guided by two hemispherical segments 58 which allow the steel band 59 to maintain its position while offering an additional clamping force between the internal sealing surface 64 of the lip portion 70 and the pipe 40. While this additional clamping force is not necessary in most applications, it may meet some specific, customer requirements.

Figure 8:
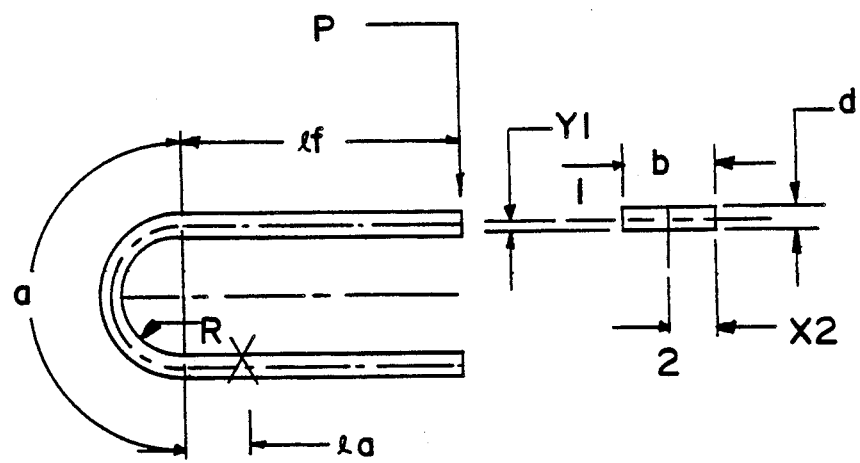
FIG. 8 illustrates exemplary design parameter considerations involved in the construction of the spring ring in accordance with the present invention.

Meant by way of illustration but not of limitation, the following values are typical of the design and application parameters upon which the development of a connector seal 1 in accordance with the present invention will be based. The values and variables are intended to be construed as corresponding specifically with FIG. 8.

$\Delta Y =$ Deflection of the "Y" axis in inches $P = 168$ psi $R = .375$ inches -continued $E = 29 \times 10^6$ (where material is stainless steel with 17-7 PH)

$I$ = moment of inertia of cross section
   = $1/12\ bd^3$
   = $1/2(.5043)(.125)^3$
   = $8.208007813\ E - 05$
   (where $b$ = material width in inches; and
   $d$ = material thickness in inches)

$C$ = Curved-end cantilevered spring correction factor (for this application $C = 70$)

$L$ = moment arm in inches

If $lf < la$ and $(la - lf) < (lf + la)$ then $L = lf + R$ $lf$ = Length of straight section free end
   = 1.125 inches $la$ = Length of straight section anchor end
   = 0 inches $\Delta Y = \dfrac{PR^3}{EI} C^3$ $= \dfrac{(168)(.375)^3}{(29 \times 10^6)(8.208007813E\text{-}05)}(70)$ $= .2605$ $S = \dfrac{6PL}{bd^2}$ $= \dfrac{(6)(168)(1.25)}{(5043)(.125)^2}$ $= 159,904.8186$ If stress is less than 80% of Tensile Range, then design is OK for application.

$\dfrac{159,905}{240,000} \times 100 = 66.7\%$

Since 66.7% is less than 80%, these design parameters would be acceptable for this application.

The embodiments described above are but three of several which utilize this invention, and are set out here by way of illustration but not of limitation. Many other embodiments which will be readily apparent to those skilled in the art may be made without materially departing from the spirit and scope of this invention. The invention, therefore, is to be defined by the claims that follow.

What is claimed is:

1. A connector seal for sealing a hole in a wall of a fluid-containing well wherein a section of open-ended pipe or conduit passes through the hole to position its open end within the well, said connector seal comprising:

an elastomeric annularly shaped body comprising an inner surface which defines a first opening which is larger in diameter than the pipe to be inserted through it;

an elastomeric lip portion projecting from said body circumferentially away from said first opening toward the fluid-containing well and tapering toward the center of a cylinder defined by said inner surface to define a second opening which is smaller in diameter than the pipe which is to be inserted through it so that said lip portion must flex radially outwardly upon insertion of the pipe while pressing against the outer surface of the pipe to thereby form a tight seal;

and an outer portion curvedly projecting outwardly from said body to, in combination with said body, form a U-shaped cross section and thereby define a channel which is positioned concentrically between said body and said outer portion, said outer portion having an outer contact surface which defines a circle slightly greater in diameter than the hole in the wall into which the connector seal is inserted in order to form a tight seal with that wall; and an annular spring ring shaped to conform to said channel defined by said U-shaped cross section and positioned within said channel to ensure that when said connector seal is inserted into the hole in the wall said curvedly projecting outer portion will only deflect minimally, thereby ensuring that said outer contact surface provides a tight seal against the hole.

2. The connector seal of claim 1 wherein said spring ring further comprises:

an annularly shaped stiffening ring positioned concentrically between said elastomeric body and said outer portion for reinforcing said body from excessive deformation and for providing a further means to support and distribute static concentrated load forces; and a series of curved moment arms radially anchored to said stiffening ring and projecting outwardly from said stiffening ring to conform to said U-shaped cross section and positioned in relation to one another such that they are separated by a uniform void area, said moment arms being provided around the entire circumference of said elastomeric body and able to function independently of one another to urge said outer contact surface of said outer portion to remain in constant contact with the inner surface of the hole within which said connector seal is positioned about sale elastomeric body's entire circumference.

3. The connector seal of claim 1, wherein said outer contact surface of said outer portion includes a series of arrow-like wedges projecting therefrom to provide a means for preventing said connector seal from being pulled out of the hole in the wall as well as to provide an initial sealing means.

4. The connector seal of claim 1, wherein said outer portion is provided with a beveled edge to facilitate insertion of said connector seal into the hole in the wall.

5. The connector seal of claim 1, wherein said elastomeric body is constructed of an elastomeric material with a durometer hardness of 40–50 shore A to allow proper sealing and deformation of said outer contact surface.

6. The connector seal of claim 1, wherein said outer contact surface further includes a first inclined surface which intersects tangent to an arc radius curve of a semi-annulus of an O-ring of circular cross section which is provided as said connector seal's primary sealing surface.

7. The connector seal of claim 6, wherein said outer contact surface includes a second incline surface which intersects tangent to a second arc radius surface these two second surfaces providing a secondary sealing surface.

8. The connector seal of claim 1, wherein said elastomeric body inwardly projecting lip has an inner sealing surface which defines a cone shape.

9. The connector seal of claim 1, wherein said elastomeric body inwardly projecting lip portion comprising an inner surface, an outer surface and an inclined surface defining the end of the lip;
   the intersection of the inner surface and the inclined surface defining a first, acute, angle;
   the intersection of the outer surface and the inclined surface defining a second, obtuse angle;
   the sum of said first and said second angles approximately equal to 180 degrees.

10. The connector seal of claim 9, wherein said end of said inwardly projecting lip portion comprises an inclined surface and an inner surface, said inner surface elongating due to friction forces generated when the pipe is inserted into said connector seal, and through this elongation generating a radial compression force thereby causing said inner edge to form a seal with the outer surface of the pipe.

11. The connector seal of claim 1, wherein said outer portion projects curvedly outwardly such that said channel defined by said U-shaped profile of said outer portion and said body faces with its open portion facing away from the fluid-containing well.

12. The connector seal of claim 1 wherein said outer portion projects curvedly outwardly such that said channel defined by said U-shaped profile of said outer portion and said body faces with its open portion facing toward the fluid-containing well.

13. The connector seal as set forth in claim 1 wherein a steel band is positioned to circumscribe said lip to generate additional sealing pressure between said lip and the pipe.

* * * * *